L. A. CHICHESTER.
Cradles.
No. 5,496. Reissued July 22, 1873.
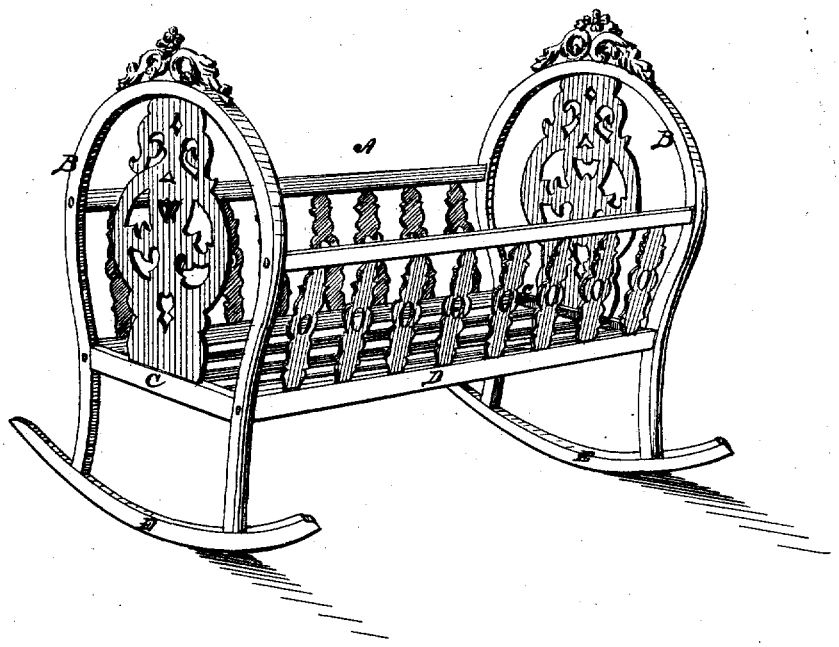
Witnesses:
H. L. Wattenberg
M. Lovell
Inventor:
Lemuel A. Chichester
Per Geo. Gunnipton
Attorney.
AM. PHOTO-LITHOGRAPHIC CO. N.Y. (OSBORNE'S PROCESS.)

UNITED STATES PATENT OFFICE.

LEMUEL A. CHICHESTER, OF POUGHKEEPSIE, NEW YORK.

IMPROVEMENT IN CRADLES.

Specification forming part of Letters Patent No. 95,768, dated October 12, 1869; reissue No. 5,496, dated July 22, 1873; application filed July 2, 1873.

*To all whom it may concern:*

Be it known that I, L. A. CHICHESTER, of Poughkeepsie, in the county of Dutchess and State of New York, have invented a new and useful Improvement in Cribs or Cradles; and that the following is a full, clear, and exact description of the same, reference being had to the accompanying drawings and to the letters of reference marked thereon making a part of this specification.

This invention is in the nature of an improvement in children's cradles or cribs; and the invention consists in constructing the end frame-work of such cradles or cribs either wholly or in part of wood that has been bent to the required form and size, the lower portion of said frame-work being secured to rockers. By this means I construct a child's cradle or crib not only of great lightness and strength, but at a cost not heretofore attained in the construction of cradles or cribs.

In the accompanying drawing a perspective view of my cradle or crib is shown, wherein—

A represents a child's cradle, the end frame-work B of which is formed wholly of bent wood—that is, wood that has been by mechanical force bent to a given size and shape.

These end frames may be constructed either of one continuous strip of bent wood or of several pieces joined together in any desirable manner. The bows of the bent ends above mentioned may, if desired, extend above the sides of the cradle or crib, in which case they afford a convenient support for mosquito-nets, &c.

To the bent ends B are framed the cross-bars C to support the bottom of the cradle or crib, and also the rails D for forming the sides of the cradle or crib. The space inclosed by the bent ends may be filled in any simple manner with scroll-work, slats, or even cane. To the ends of the bent frame-work, if designed for a cradle, the rockers E may be attached, and this completes my cradle or crib.

I do not wish nor intend in this patent to confine myself to any particular form, shape, or size of cradle or crib to which my invention is applicable; nor do I wish to confine myself to constructing the bent ends or frame-work of my cradle or crib of one continuous piece of wood, for it is quite evident that the same may be formed of one or more pieces of bent wood with equal facility; but What I do claim as new, and desire to secure by Letters Patent, is—

As a new article of manufacture, a crib or cradle with the ends thereof constructed wholly or in part of one or more pieces of wood bent to the proper size and shape, in combination with rockers, substantially as hereinbefore described.

L. A. CHICHESTER.

Witnesses:
H. L. WATTENBERG,
G. M. PLYMPTON.